(12) United States Patent
Staroselsky et al.

(10) Patent No.: US 7,840,301 B2
(45) Date of Patent: Nov. 23, 2010

(54) SYSTEM AND METHOD FOR OPTIMIZING TRANSMISSION COMPONENT LIFE AND TRANSMISSION POWER

(75) Inventors: Alexander Staroselsky, Avon, CT (US); Clark V. Cooper, Arlington, VA (US); Igor I. Fedchenia, West Hartford, CT (US); Edward J. Karedes, Cheshire, CT (US)

(73) Assignee: United Technologies Corporation, Hartford, CT (US)

( * ) Notice: Subject to any disclaimer, the term of this patent is extended or adjusted under 35 U.S.C. 154(b) by 228 days.

(21) Appl. No.: 12/084,606

(22) PCT Filed: Dec. 2, 2005

(86) PCT No.: PCT/US2005/043752

§ 371 (c)(1),
(2), (4) Date: May 6, 2008

(87) PCT Pub. No.: WO2007/064331

PCT Pub. Date: Jun. 7, 2007

(65) Prior Publication Data

US 2009/0099675 A1  Apr. 16, 2009

(51) Int. Cl.
*G06F 19/00* (2006.01)
*G01B 5/28* (2006.01)
*B25F 3/00* (2006.01)
*B26F 3/00* (2006.01)
*B27B 21/00* (2006.01)
*B23D 63/00* (2006.01)

(52) U.S. Cl. .................. 700/117; 702/35; 30/144; 30/166.3; 30/504; 76/25.1

(58) Field of Classification Search .............. 700/117; 702/35; 30/144, 166.3, 504; 76/25.1
See application file for complete search history.

(56) References Cited

U.S. PATENT DOCUMENTS

| | | | | | |
|---|---|---|---|---|---|
| 4,456,960 | A | * | 6/1984 | Wakai | 700/175 |
| 4,550,376 | A | * | 10/1985 | Maciejczak | 703/1 |
| 4,872,337 | A | * | 10/1989 | Watts et al. | 73/162 |
| 4,931,949 | A | * | 6/1990 | Hernandez et al. | 702/35 |
| 5,243,533 | A | * | 9/1993 | Takagi et al. | 700/175 |
| 5,539,656 | A | * | 7/1996 | Annigeri et al. | 702/35 |
| 5,871,391 | A | * | 2/1999 | Pryor | 451/9 |
| 6,199,431 | B1 | * | 3/2001 | Nath et al. | 73/579 |
| 6,225,892 | B1 | * | 5/2001 | Chene | 340/438 |
| 6,526,356 | B1 | * | 2/2003 | DiMaggio et al. | 702/35 |

(Continued)

OTHER PUBLICATIONS

Hamidieh et al., "Tuned Vibration Based Gear Checker for Gear Profile Anomaly Detection"2006, Proceedings of MSEC2006, ASME International Conference on Manufacturing Science and Engineering, p. 823-831.*

(Continued)

*Primary Examiner*—Albert DeCady
*Assistant Examiner*—Thomas H Stevens
(74) *Attorney, Agent, or Firm*—Carlson, Gaskey & Olds PC

(57) ABSTRACT

A power transmission system including a component having a surface and a plurality of micro-defects is provided. The surface has a distribution of asperities has a second resonance frequency distribution that is substantially outside of the resonance frequency distribution.

26 Claims, 6 Drawing Sheets

U.S. PATENT DOCUMENTS

| | | | |
|---|---|---|---|
| 6,681,787 B2* | 1/2004 | Tinsley et al. | 137/10 |
| 6,763,130 B1* | 7/2004 | Somekh et al. | 382/145 |
| 6,792,360 B2* | 9/2004 | Smulders et al. | 702/35 |
| 2003/0088338 A1* | 5/2003 | Phillips et al. | 700/282 |

OTHER PUBLICATIONS

Nevzat et al., "Mathematical Models Used in Gear Dynamics—A Review", 1988, Journal of Sound and Vibration. p. 384-412.*

* cited by examiner

SYSTEM AND METHOD FOR OPTIMIZING TRANSMISSION COMPONENT LIFE AND TRANSMISSION POWER

GOVERNMENT RIGHTS IN THE INVENTION

The invention was made by or under contract with the National Institute of Standards and Technology under contract number 70NANB0H3048.

BACKGROUND OF THE INVENTION

1. Field of the Invention

This invention relates generally to power transmissions and, more particularly, to a system and method for optimizing the life of power transmission components.

2. Description of the Related Art

The phenomenon of gear fatigue life is, by its nature, statistical. Two physical sources of fluctuation determine gear life—a random (rough) contact surface and defect dynamics under applied stress and thermal fluctuations. When two mating gear surfaces are placed into contact with each other under pressure, contact occurs at the points of asperities interactions, the result of which is local stress concentration at the junctions and lower stresses in other regions. Transient analyses of contacts, based on surface roughness profiles, are defined by profilometer traces, from which spectral characteristics may be obtained through Fourier transformation. Locally, damage accumulation is determined by defect concentration caused by the concentration of stress that plays the role of control parameter for defect nucleation and can be described by stress induced migration between multi-well free energy minima under the simultaneous thermal fluctuations that are proportional to temperature. Stochastic resonance theory and experimental results suggest that, when the Kramer's rate of escape from a free energy minimum has a value approximately equal to the periodic perturbation, in this case taken to be the periodic load or periodic stress due to machining features or other asperities, defect nucleation dramatically increases.

Sliding friction affects the gear tooth as an excitation. Sliding friction can be modeled as an external excitation with the same fundamental period as a gear surface profile. At high power operating gear mode, a lubricant film might be partially broken; under such circumstances, a regime of boundary lubrication is activated. Contact at asperities generates periodic force with a known spectral function. Also, each of the asperities contacts causes local asperity vibration, which in turn generates sound waves with specific frequencies within the subsurface layer. Micro-defects distributed within this layer have their own resonance frequencies. If these resonant frequencies are nearly equal, the process of damage accumulation significantly accelerates. As shown in FIGS. 3 and 4, stress intensity factors are maximized for wave numbers $\beta=(\omega a)/c$ belonging to the interval from $\beta=1.3$ to $\beta=2$; where $\omega$ is loading frequency and c is the speed of the elastic wave.

Accordingly, there is a need for systems and methods for optimizing power transmission component life, such as gear life. There is a further need for such systems and methods to utilize a surface having a distribution of asperities substantially outside of a resonance frequency of a gear subsurface layer. There is yet a further need for power transmission component life optimization that reduces damage from dynamic loadings, such as asperities collisions and asperities vibrations, by defining a corresponding surface profile.

SUMMARY OF THE INVENTION

A power transmission system including a component having a surface and a plurality of micro-defects is provided. The surface has a distribution of asperities. The component has a first resonance frequency distribution. The distribution of asperities has a second resonance frequency distribution that is substantially outside of the first resonance frequency distribution.

A method of producing a power transmission component having a distribution of asperities substantially outside of a resonance frequency of the component is also provided. The method includes determining one or more properties of the component, determining a rate of contact of the component with a second power transmission component, determining a distribution of asperities on a surface of the component, determining a plurality of asperity resonance frequencies of the component, calculating a distribution of the plurality of asperity resonance frequencies, applying Kramer criterion, and prescribing an optimized surface roughness for the component.

A computer readable program embodied in an article of manufacture comprising computer readable program instructions for producing a power transmission component having a surface with a distribution of asperities substantially outside of a resonance frequency of the component is further provided. The program comprises program instructions for causing a computer to determine one or more properties of the component, program instructions for causing the computer to determine a rate of contact for the component with a second power transmission component, program instructions for causing the computer to determine a distribution of asperities on the surface of the component, program instructions for causing the computer to determine a plurality of asperity resonance frequencies of the component, program instructions for causing the computer to calculate a distribution of the plurality of asperity resonance frequencies, program instructions for causing the computer to apply Kramer criterion, and program instructions for causing the computer to prescribe an optimized surface roughness for the component.

A power transmission component including an outer surface, a plurality of micro-defects, and a first resonance frequency distribution is also provided. The outer surface has a distribution of asperities. The distribution of asperities has a second resonance frequency distribution that is substantially outside of the first resonance frequency distribution.

The component may be a gear having one or more teeth. The surface may be disposed along at least a portion of the one or more teeth. The one or more teeth may be metal. The component may be a bearing. The surface may be disposed along at least a portion of the bearing. The surface may be formed by a process that prescribes an optimized surface roughness comprising determining one or more properties of the one or more teeth, determining a rate of meshing between the one or more teeth and a second gear, determining the distribution of asperities of the surface and a second distribution of asperities of the second gear, determining a plurality of asperity resonance frequencies of the one or more teeth and the second gear, calculating a distribution of the plurality of asperity resonance frequencies, and applying Kramer criterion.

The method may further comprise determining a lubrication regime of the component. Determining the lubrication regime may further comprise terminating the method if the lubrication regime is a full hydrodynamic separation regime. The lubrication regime may be selected from the group consisting of a full hydrodynamic separation regime, a mixed lubrication regime, and a boundary layer lubrication regime. The method may further comprise machining the component to the optimized surface roughness. The one or more properties may be selected from the group consisting of hardness, modulus of elasticity, Poisson's ratio, tensile strength, yield strength, one or more thermal properties, and any combinations thereof. The component may be one or more gears. Determining the rate of contact of the component with a second power transmission component may comprise determining a rate of meshing of the one or more gears. Determining the rate of meshing may comprise calculating one or more excitation frequencies selected from the group consisting of gear tooth mesh frequencies, long wavelength frequencies, asperity interaction frequencies, and any combination thereof. Determining a distribution of asperities may comprise generating a linear map of surface roughness by stylus profilometry. Determining a plurality of asperity resonance frequencies may comprise grouping a plurality of different sized asperities and determining an average value to calculate an average resonance frequency for the plurality of different sized asperities.

The program may further comprise program instructions for causing the computer to determine a lubrication regime of the component. The program may further comprise program instructions for causing the computer to terminate the program if the lubrication regime is a full hydrodynamic separation regime. The program may further comprise program instructions for causing the computer to machine the component to the optimized surface roughness. The one or more properties may be selected from the group consisting of hardness, modulus of elasticity, Poisson's ratio, tensile strength, yield strength, one or more thermal properties, and any combinations thereof. The component may be one or more gears. The program instructions for causing the computer to determine a rate of contact for the component with a second power transmission component may comprise calculating one or more excitation frequencies selected from the group consisting of gear tooth mesh frequencies, long wavelength frequencies, asperity interaction frequencies, and any combination thereof. The program may further comprise program instructions for causing a computer to generate a linear map of surface roughness by stylus profilometry. Program instructions for causing the computer to determine a plurality of asperity resonance frequencies of the one or more gears may comprise program instructions for causing the computer to group a plurality of different sized asperities and determine an average value to calculate an average resonance frequency for the plurality of different sized asperities.

The above-described and other features and advantages of the present disclosure will be appreciated and understood by those skilled in the art from the following detailed description, drawings, and appended claims.

DETAILED DESCRIPTION OF THE INVENTION

Figure 1:
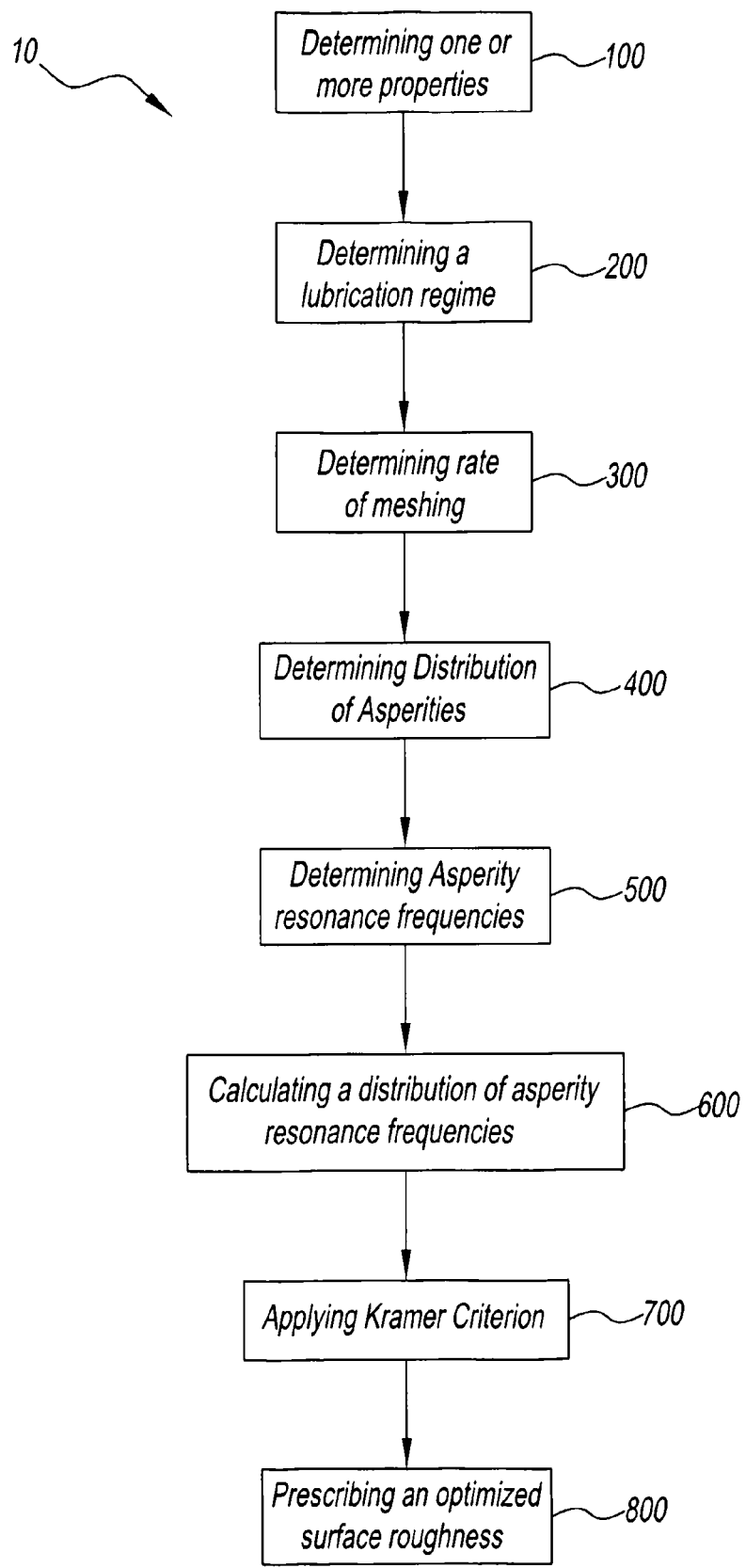
FIG. 1 is a schematic diagram of a process for forming asperities that minimally resonate during operation.

Referring now to the drawings and in particular FIG. 1, an exemplary embodiment of a system and method for forming a surface having asperities with a resonance frequency substantially outside of a resonance frequency of a gear is generally referred to by reference numeral 10 is illustrated. The method 10 analyzes both sources of periodic impacts (asperities collisions and asperities vibrations) and defines the corresponding surface profile minimizing damage from these dynamic loadings. The method 10 includes one or more of the following steps: determining one or more properties of one or more gears 100, determining the lubrication regime of the one or more gears 200, determining a rate of meshing between the one or more gears 300, determining a distribution of asperities on a surface of each of the one or more gears 400, determining asperity resonance frequencies of the one or more gears 500, calculating a distribution of asperity resonance frequencies 600, applying Kramer criterion 700, and prescribing an optimized surface roughness for the one or more gears 800. The one or more gears may also be machined to the optimized surface roughness forming one or more gears having the optimized surface roughness. The optimized surface roughness results in optimized gear life and transmission power. The one or more gears may be, such as, for example, a first gear and a second gear with the first gear mated with the second gear during operation. The first and second gears, preferably, are metal, such as, for example, ferrous alloys, preferably, surface-carburizing and surface-nitriding steel alloys, and titanium and its alloys. Additionally, while method 10 is described with respect to optimizing the life of gears, the present disclosure contemplates application of this method with respect to various power transmission components, such as, for example, bearings.

Figure 2:
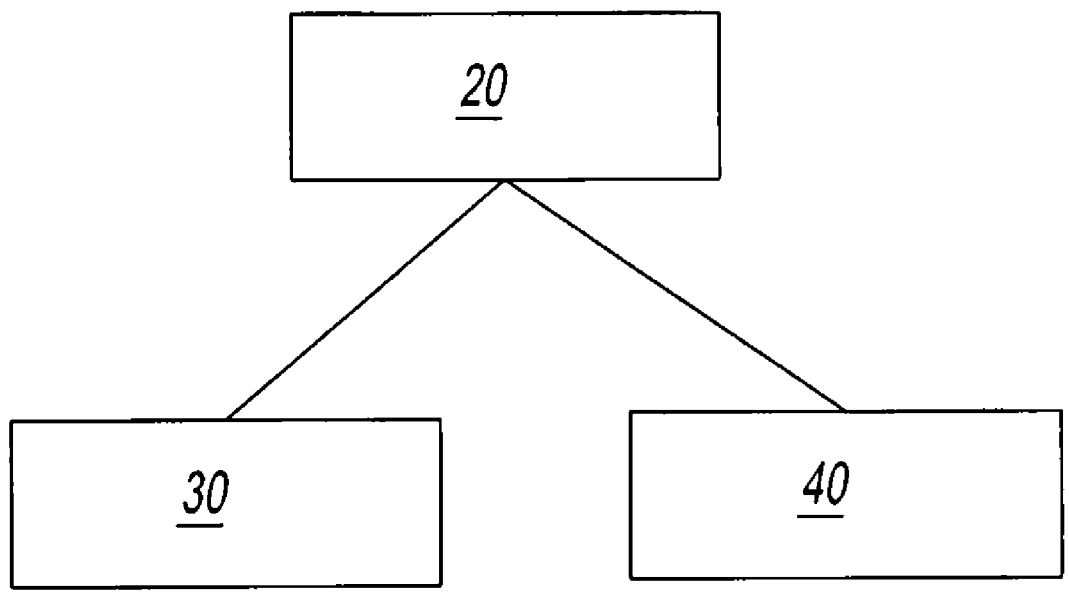
FIG. 2 is a schematic illustration of a system for forming asperities that minimally resonate during operation.

The method 10 may be machine programmable and/or software, and is more preferably a computer program product having a computer useable medium with a computer readable code means embodied in the medium designed to implement the specified parameters. However, the present disclosure contemplates implementation of the method steps described herein, in alternative ways as well. For example, as shown in FIG. 2, a control processing unit (hereinafter CPU) 20 that is in communication with one or more monitoring or sensing devices 30 and an inputting device 40 may be programmed with instructions for performing the process of method 10. In the exemplary embodiment, the CPU 20 is in communication with monitoring or measuring devices that include, but are not limited to, a device for determining a property of the first and second gears 100, a sensor to determine the lubrication regime of the first and second gears 200, a device for determining the rate of meshing of the first and second gears 300, and/or a sensor to determine the distribution of asperities on the surfaces of the first and second gears 400. Alternatively, values may be manually inputted for the properties of the first and second gears 100, the lubrication regime 200, the rate of meshing between the first and second gears 300, and/or the distribution of asperities on the surfaces of the first and second gears 400, and calculations may be performed for determining asperity resonance frequencies of the first and second gears 500, determining the distribution of asperity resonance frequency 600, applying the Kramer criterion from the inputted values 700, and/or prescribing an optimized surface roughness for the one or more gears 800. The particular devices and/or sensors described above can be chosen by one of ordinary skill in the art to facilitate gathering of the data and performing the process of method 10.

CPU 20 is described herein by way of example as a control processing unit. Of course, it is contemplated by the present disclosure for CPU 20 to include any programmable circuit, such as, but not limited to, computers, processors, microcontrollers, microcomputers, programmable logic controllers, application specific integrated circuits, and other programmable circuits. It is further contemplated by the present disclosure that CPU 20 is any number of control devices providing various types of control, e.g., centralized, distributed, redundant and/or remote control.

The determined properties of the first and second gears of step 100 provide information regarding damage susceptibility. Properties of a first material of the first gear and a second material of the second gear include, but are not limited to, hardness, modulus of elasticity, Poisson's ratio, tensile strength, yield strength, and other analogous properties. Thermal properties of the first gear and the second gear may also be determined. Preferably, the properties determined are elastic properties that govern resonance of the first gear and the second gear, more preferably, the modulus of elasticity and/or Poisson's ratio are determined. The properties of the first gear and the second gear may be different if the first gear is a different material composition than the second gear. The first gear and the second gear comprised of a same material may have substantially the same properties.

A first lubrication regime of the first gear and a second lubrication regime of the second gear are determined in step 200. The first and second lubrication regimes may be a full hydrodynamic separation regime, a mixed lubrication regime, or a boundary layer lubrication regime. The full hydrodynamic separation regime has a lubricant film of sufficient thickness to prevent asperity contact between the first gear and the second gear. The mixed lubrication regime has a sufficient film thickness to prevent contact of asperities during a majority of time of operation while allowing occasional asperity contact between the first gear and the second gear. The boundary layer lubrication regime has an oil film thickness that is insufficient to prevent asperity contact between the first gear and the second gear. The first and second gears have the same lubrication regime unless each gear has a different surface roughness. For example, one of the first and second gears may have a finer surface roughness and another one of the first and second gears may have a coarser surface roughness. The finer surface roughness may have a sufficient oil film thickness to prevent asperity contact and the coarser surface roughness may have an insufficient oil film thickness to prevent asperity contact.

The optimized surface roughness may not be necessary for the first gear and the second gear if they are in the full hydrodynamic separation lubrication regime because asperities of the first and second gears are not in contact and, consequently, do not resonate. Thus, the remaining steps of the method 10 are not required to be performed, e.g., a routine may be exited in a computer program that instructs the performance of method 10. However, decreased load, speed, increase in temperature, or any change in condition causing the first or second gears to leave the full hydrodynamic lubrication regime leads to possible asperity contact, thus, the remaining steps of the method 10 are applicable.

The rate of meshing between the one or more gears of step 300 provides a rate of contact of the first gear with the second gear per unit time. In operation, the first and second gears may operate at a fixed velocity, e.g. gears in an engine with reduction, so that the rate of meshing may be determined through measuring a first velocity of the first gear and a second velocity of the second gear.

Determining the rate of meshing of the one or more gears of step 300 may comprise calculating one or more excitation frequencies associated with a surface characteristic of the first and second gears. The one or more excitation frequencies may include gear tooth mesh frequencies, long wavelength frequencies or waviness, asperity interaction frequencies, and any combination thereof. The long wavelength frequencies or waviness may be along an involute surface. The rate of contact of the first and second gears may have a long wavelength frequency that has a different frequency than the rate of meshing of the asperities.

A distribution of asperities on a surface of each of the one or more gears may be determined in step 400 through a surface roughness measurement, e.g., a direct experimental measurement. One example of a surface roughness measurement is stylus profilometry. Stylus profilometry generates a linear map of surface roughness by translating a diamond stylus across the surface of each of the one or more gears, resulting in a surface profile having a resolution of about 10 micrometers ($\mu$m). The distribution of asperities may be calculated through an advanced Fourier transform to generate a histogram distribution. The distribution of asperities may be equally distributed or have high concentrations of different sized and shaped asperities in certain locations. The most common technique for measuring the surface roughness of gear involute surfaces is a stylus-type, contacting surface profilometer. Such instruments use a stylus composed of diamond or other suitably hard substance, having a sharp tip (tip radius of curvature of 15 $\mu$m or less), which is translated across the surface of interest under a very light load. Another distinct technique for the measurement of surface roughness is atomic-force microscopy, which constructs a three-dimensional map of the surface being measured and produces surface details with a resolution of less than about 1 nanometer (nm). A third complementary but independent technique for measuring surface roughness is a non-contacting technique that uses laser reflectance, which digitally reconstructs the surface features and has a resolution on the order of its wavelength (hundreds of nm).

Asperity resonance frequencies of the one or more gears is determined in step 500 using the asperity distribution, the rate of meshing, and properties, e.g., modulus of elasticity, of the one or more gears. There is a different resonance frequency for each asperity of a different size. Thus, substantially every asperity has a different resonance frequency. A distribution of asperity resonance frequencies may be calculated. Different sized asperities may be grouped to determine an average value giving a same resonance frequency for each asperity. One or more averages may be determined for one or more resonance frequencies. For example, if the frequency distribution has different distributions at different locations on the gear, a plurality of averages may be determined for a plurality of resonance frequencies to be avoided in operation.

In step 700, the Kramer criterion may be applied to the distribution of asperity resonance frequency. The Kramer criterion is given by $\tau \equiv (kT)/h(\exp(-(\Delta G)/kT))$ where $\tau$ is a time period, k is Boltzmann constant, T is temperature, ΔG is change in free energy, a frequency of periodic load ω, and h is Planck constant.

The optimized surface roughness is calculated in step 800 based on the results from the Kramer criterion. The optimized surface roughness prevents excitation of the first and second gears at their natural frequencies. The first and second gears may then be finished with a surface roughness, which results in asperity resonance frequencies that are substantially outside of the Kramer criterion.

Figure 3:
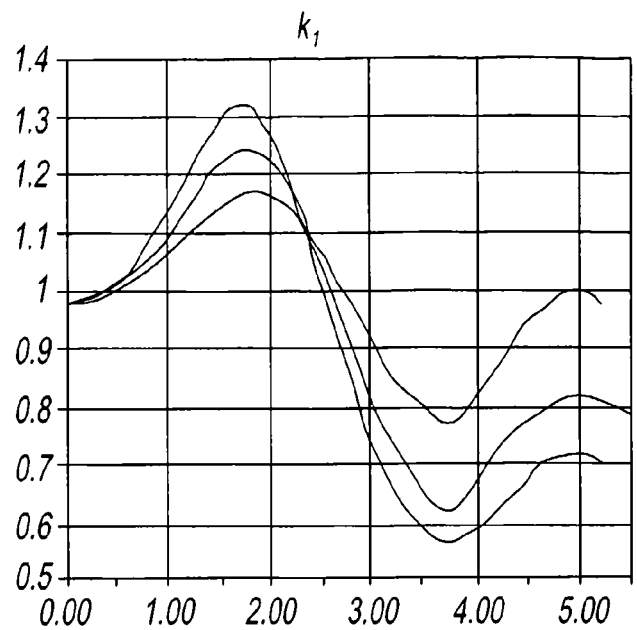
FIG. 3 is a graphical depiction of normalized stress intensity factors for mode II shear crack under dynamic load for gear teeth.
Figure 4:
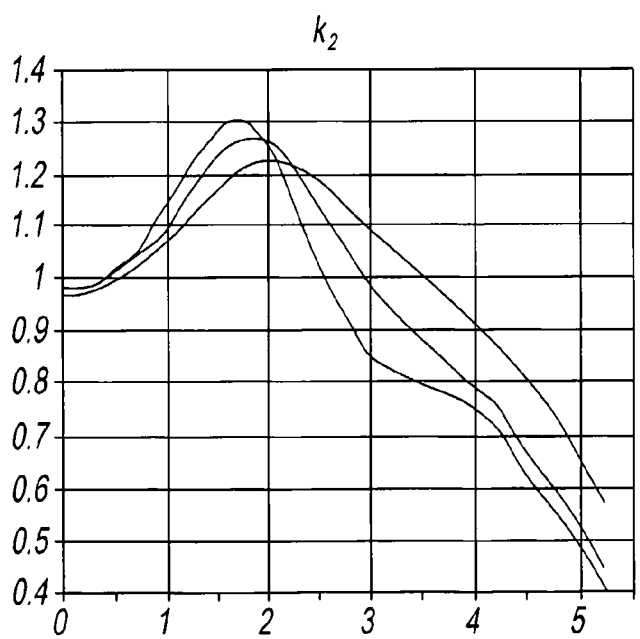
FIG. 4 is a graphical depiction of normalized stress intensity factors for mode III shear crack under dynamic load for gear teeth.

In a preferred embodiment, to determine the asperity resonance frequencies 500, the frequency of contact, between two periodic asperities moving with the velocity, V, and having a wavelength, λ, given by ω=2π(V/λ) is calculated. Equating corresponding wave number to critical $\beta_c \in (1.2, 2)$, such as, for example, shown in FIGS. 3 and 4, results in a determination of the range of surface profile length waves that cause harmonic resonance and rapid growth of the subsurface defects with size $$a[\mu m]: \lambda = \frac{2\pi a}{\beta_c} \cdot \frac{V}{c} \approx \pi a \cdot \frac{V}{c}.$$

For typical crack nucleus dimensions of 1 to 3 micrometers and for typical gear tooth surface velocities, the characteristic wavelength is of an order of several nanometers or, in other words, less than about 1 microinch. This wavelength is significantly less than the major machining-induced surface roughness and may be ignored. Spectra that are representative of gear teeth in as-ground and isotropic superfinished (ISF) conditions are given in FIGS. 5 and 6, respectively.

Figure 5:
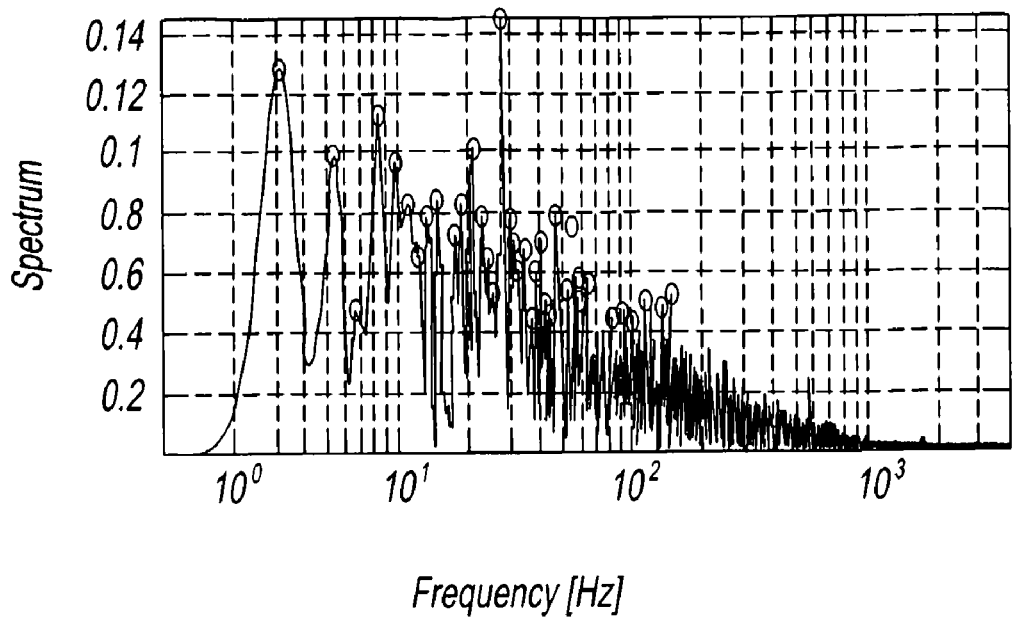
FIG. 5 is a graphical depiction of spectrum of as-ground surface for gear teeth.
Figure 6:
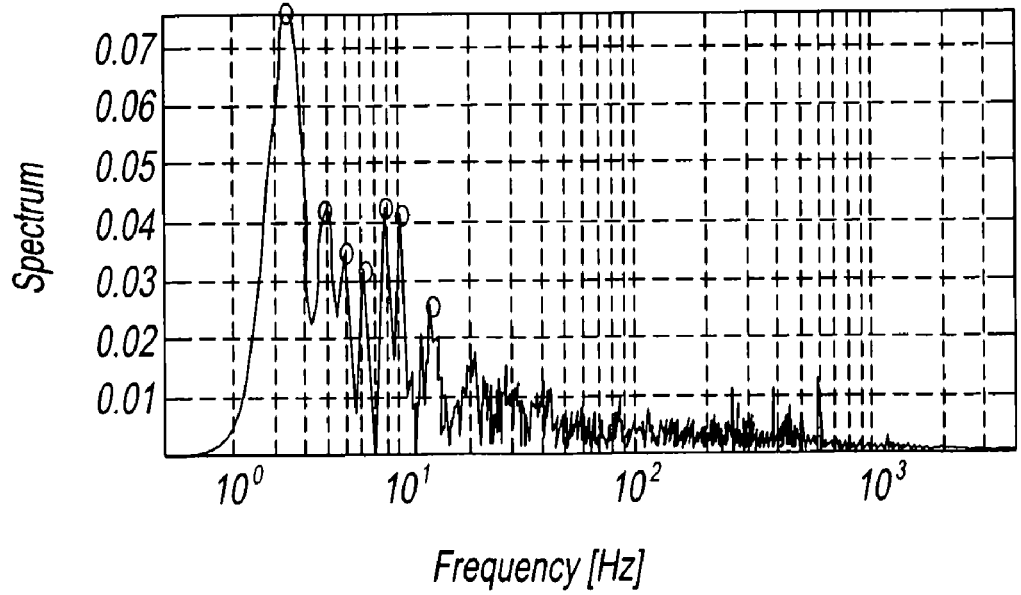
FIG. 6 is a graphical depiction of spectrum of isotropic superfinished surface for gear teeth.

Both of these spectra of FIGS. 5 and 6 are similar in major frequencies but different in magnitudes. A wavelength of significant machining features, in microinches, corresponds to very small asperities and need not be considered. For example, a specific machine-induced wavelength of 400 micrometers would affect a crack of 10 centimeters in length, which is already supercritical in size. Another important wavelength of 50 micrometers would affect a crack of 1 centimeter size growth, which is also too large for the gear tooth subsurface.

Figure 7:
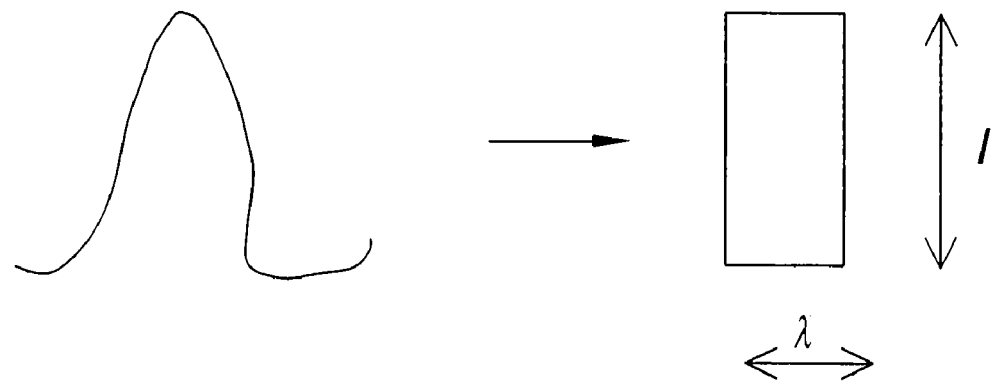
FIG. 7 is a schematic depiction of an asperity for gear teeth.

For example, for an asperity of the size λ by l, as shown in FIG. 7, after each collision with another tooth surface, free vibrations occur in the asperity generating an elastic wave with a first mode of natural vibration that has the greatest amplitude. The first resonance/natural mode takes place when αl=1.875 and $\alpha^4=(\omega^2/c^2)(F/I_x)$; where $I_x$ is the moment of inertia, F is the cross-sectional area, c is the speed of elastic-wave transmission, ω is the natural frequency, l is the length of the gear tooth, and α is a parameter that is calculated using the equation shown above. A change in the asperity geometry affects only the ratio F/I, which is relatively invariant. Substituting expression as follows F=λH; $I_x=(\lambda^3 H)/12$; yields $\omega/c=(1.875^2/12)(\lambda/l^2) \approx (\lambda l^2)$, and H is the average thickness of the tooth.

$$\beta = \frac{\omega a}{c} = \frac{\lambda a}{l^2} \in (1.2, 2).$$

The value, 12, comes from a calculation for the moment of inertia, I, of a beam, and 1.875 is a solution to the equation for a first natural frequency of a cantilever beam.

Figure 8:
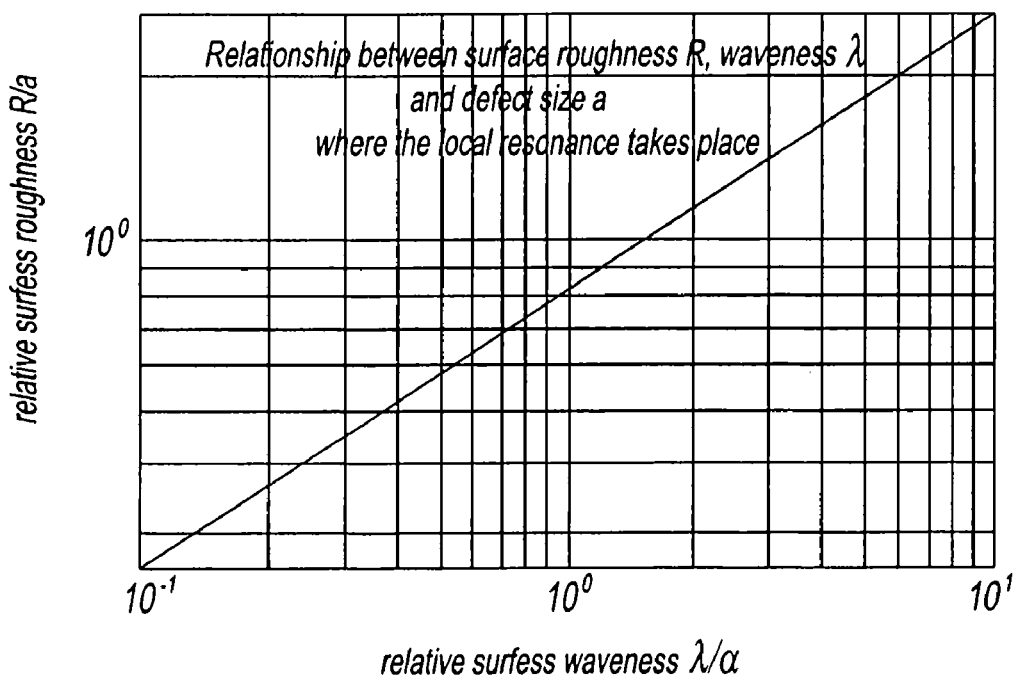
FIG. 8 is a graphical depiction of a relationship between surface roughness parameters and subsurface defect size causing local resonance and fast defect growth for gear teeth.

The wave number according to the flow resonance criteria is $\beta=(\omega a)/c=(\lambda a)/l^2$ changes in the interval from 1.2 to 2. From here, the average asperity roughness, R=l, varies as the square root of the roughness wavelength, as shown in FIG. 8.

From these estimations and taking into account typical surface roughness spectra, the following table is compiled:

| R [μm] | λ [μm] | Observed R [μm] | Dangerous Defect Size [nm] |
|---|---|---|---|
| 0.8 | 1 | Not measured | |
| 2.5 | 10 | 0.05 | 0.4 |
| 8 | 100 | 0.1-.3 | 2 |
| 16 | 400 | 0.15-.3 | 0.6 |

Based on these estimations, asperities are always far from a local resonance range. However, at an initial stage of defect nucleation, 2 nanometers size, flaws are already substantial, so a most dangerous region of a surface roughness is asperities with wavelength of 100 micrometers and magnitude of approximately 0.1 to 0.3 micrometers. Thus, polishing in this embodiment should continue until an achievement of a surface roughness of approximately 5 microinches; further refinement in surface roughness (finish) is unnecessary and unproductive. Refining the surface finish to a prescribed level, however, enhances surface durability. For a whole tooth of the first or second gears, in this embodiment, the ratio is given by $1.5(l^2/\lambda) \approx 10\text{-}15$ millimeters.

Unlike gears, bearings, such as roller-type and ball-type anti-friction bearings, tend to be used in applications in which a relative velocity is extremely high. This is particularly valid for bearings used in gas turbine engines. Indeed, bearing designs in mechanical systems are limited in their applicability, typically expressed as the "DN" limit. Accordingly, a bearing bore diameter, expressed in millimeters, multiplied by its rotational speed, expressed in revolutions per minute, may not exceed a specified value; this DN limit may be considered to be a bearing design limit. Extending the design envelope for bearings to enable their use to DN values greater than 2 million has been the goal of design engineers for several years. As shown in FIG. 6, because of the greater speed and lower surface roughness that typifies anti-friction bearings, the approach of method 10 may be applied to a design of bearings to avoid problematic resonance frequencies and their consequential damage through growth of cracks and other flaws that are sub-critical in size.

Figure 9:
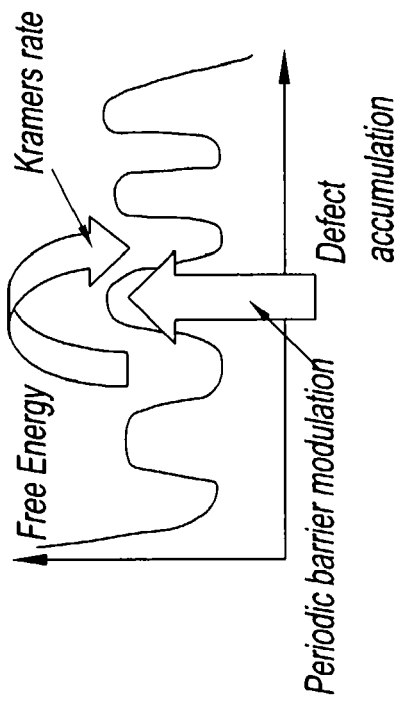
FIG. 9 is a graphical depiction of a distribution of residence time in a well of free energy as a function of frequency of external excitation (increases from top to bottom) for gear teeth.
Figure 9:
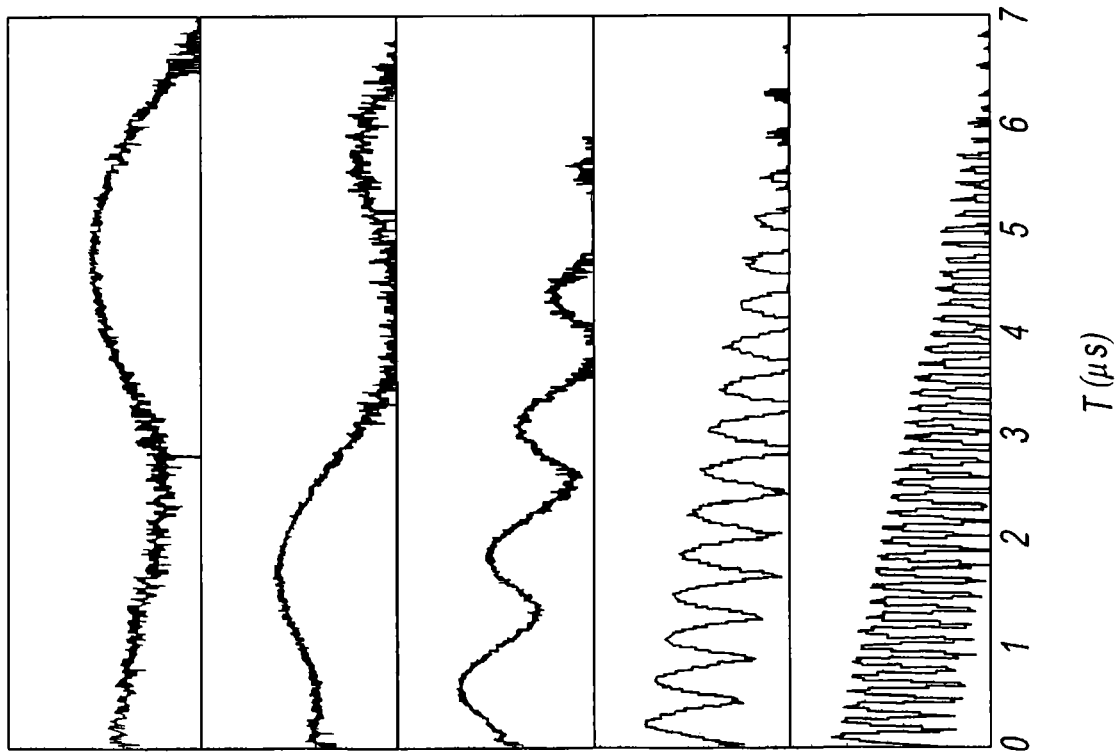

As is clear from FIG. 9, the peak in the mean residence time shifts from higher values to lower values (defects are created more frequently) as frequency of barrier modulation grows. For a certain frequency value, a maximum of a shortest time reached is a highest value, which is the worst case scenario for material durability under the periodic load and thermal impact. The worst case scenario combination of a periodic load frequency and a temperature could be estimated from an equality of a Kramers rate of escape from one well of free energy potential to another as calculated by the equation below:

$$\tau=(kT)/h(\exp(-(\Delta G)/kT)).$$

For the barrier height that is typical for steel $\Delta G \approx 66(T/T_{melt})$, $T_{melt}$ is a melting temperature for steel, a frequency band for a periodic load where a maximum amount of defects nucleates per unit time concentrates between 0.1<ω<10 where ω is the loading frequency. This value will grow for materials with lower melting temperature and for higher working temperatures.

The present invention may be utilized to optimize a variety of transmission components, such as but not limited to, helical gears, hypoid gears, spiral bevel gears, spur gears, and zerol bevel gears.

While the instant disclosure has been described with reference to one or more exemplary embodiments, it will be understood by those skilled in the art that various changes may be made and equivalents may be substituted for elements thereof without departing from the scope thereof. In addition, many modifications may be made to adapt a particular situation or material to the teachings of the disclosure without departing from the scope thereof. Therefore, it is intended that the disclosure not be limited to the particular embodiment(s) disclosed as the best mode contemplated for carrying out this invention, but that the invention will include all embodiments falling within the scope of the appended claims.

What is claimed is:

1. A power transmission system comprising:
   a component having a surface and a plurality of micro-defects,
   wherein said surface has a distribution of asperities, wherein said component has a first resonance frequency distribution, and wherein said distribution of asperities has a second resonance frequency distribution that is substantially outside of said first resonance frequency distribution.

2. The system of claim 1, wherein said component is a gear having one or more teeth, wherein said surface is disposed along at least a portion of said one or more teeth, and wherein said one or more teeth are metal.

3. The system of claim 1, wherein said component is a bearing, and wherein said surface is disposed along at least a portion of said bearing.

4. The system of claim 2, wherein said surface is formed by a process that prescribes an optimized surface roughness comprising determining one or more properties of said one or more teeth, determining a rate of meshing between said one or more teeth and a second gear, determining said distribution of asperities and a second distribution of asperities of said second gear, determining a plurality of asperity resonance frequencies of said one or more teeth and said second gear, calculating a distribution of said plurality of asperity resonance frequencies, and applying Kramer criterion.

5. The system of claim 3, wherein said surface is formed by a process that prescribes an optimized surface roughness comprising determining one or more properties of said bearing, determining a rate of contact of said surface with a second component, determining said distribution of asperities and a second distribution of asperities of said second component, determining a plurality of asperity resonance frequencies of said bearing and said second component, calculating a distribution of said plurality of asperity resonance frequencies, and applying Kramer criterion.

6. A method of producing a power transmission component having a distribution of asperities substantially outside of a resonance frequency of the power transmission component, the method comprising:
   determining one or more properties of the power transmission component;
   determining a rate of contact of the power transmission component with a second power transmission component;
   determining a distribution of asperities on a surface of the power transmission component;
   determining a plurality of asperity resonance frequencies of the power transmission component;
   calculating a distribution of said plurality of asperity resonance frequencies;
   applying Kramer criterion; and
   prescribing an optimized surface roughness for the power transmission component.

7. The method of claim 6, further comprising determining a lubrication regime of the power transmission component.

8. The method of claim 7, wherein determining said lubrication regime further comprises terminating the method if said lubrication regime is a full hydrodynamic separation regime.

9. The method of claim 7, wherein said lubrication regime is selected from the group consisting of a full hydrodynamic separation regime, a mixed lubrication regime, and a boundary layer lubrication regime.

10. The method of claim 6, further comprising machining the power transmission component to said optimized surface roughness.

11. The method of claim 6, wherein said one or more properties are selected from the group consisting of hardness, modulus of elasticity, Poisson's ratio, tensile strength, yield strength, one or more thermal properties, and any combinations thereof.

12. The method of claim 6, wherein said power transmission component is one or more gears, and wherein determining said rate of contact of the power transmission component with a second power transmission component comprises determining a rate of meshing of said one or more gears.

13. The method of claim 12, wherein determining said rate of meshing comprises calculating one or more excitation frequencies selected from the group consisting of gear tooth mesh frequencies, long wave length frequencies, asperity interaction frequencies, and any combination thereof.

14. The method of claim 6, wherein determining a distribution of asperities comprises generating a linear map of surface roughness by stylus profilometry.

15. The method of claim 6, wherein determining a plurality of asperity resonance frequencies comprises grouping a plurality of different sized asperities and determining an average value to calculate an average resonance frequency for said plurality of different sized asperities.

16. A computer readable program embodied in an article of manufacture comprising computer readable program instructions for producing a power transmission component having a surface with a distribution of asperities substantially outside of a resonance frequency of the power transmission component, said computer readable program comprising:
   program instructions for causing a computer to determine one or more properties of the power transmission component;
   program instructions for causing said computer to determine a rate of contact for the power transmission component with a second power transmission component;
   program instructions for causing said computer to determine a distribution of asperities on the surface of the power transmission component;
   program instructions for causing said computer to determine a plurality of asperity resonance frequencies of the power transmission component;
   program instructions for causing said computer to calculate a distribution of said plurality of asperity resonance frequencies;
   program instructions for causing said computer to apply Kramer criterion; and
   program instructions for causing said computer to prescribe an optimized surface roughness for said the power transmission component.

17. The computer readable program of claim 16, further comprising:
   program instructions for causing said computer to determine a lubrication regime of the power transmission component.

18. The computer readable program of claim 17, further comprising:
   program instructions for causing said computer to terminate the program if said lubrication regime is a full hydrodynamic separation regime.

19. The computer readable program of claim 16, further comprising:
   program instructions for causing said computer to machine the power transmission component to said optimized surface roughness.

20. The computer readable program of claim 16, wherein said one or more properties are selected from the group consisting of hardness, modulus of elasticity, Poisson's ratio, tensile strength, yield strength, one or more thermal properties, and any combinations thereof.

21. The computer readable program of claim 16, wherein said power transmission component is one or more gears, wherein said program instructions for causing said computer to determine a rate of contact for the power transmission component with a second power transmission component comprises calculating one or more excitation frequencies selected from the group consisting of gear tooth mesh frequencies, long wave length frequencies, asperity interaction frequencies, and any combination thereof.

22. The computer readable program of claim 16, further comprising program instructions for causing a computer to generate a linear map of surface roughness by stylus profilometry.

23. The computer readable program of claim 16, wherein program instructions for causing said computer to determine a plurality of asperity resonance frequencies of one or more gears comprises program instructions for causing said computer to group a plurality of different sized asperities and determine an average value to calculate an average resonance frequency for the plurality of different sized asperities.

24. A power transmission component comprising:
   an outer surface;
   a plurality of micro-defects; and
   a first resonance frequency distribution,
   wherein said outer surface has a distribution of asperities, and wherein said distribution of asperities has a second resonance frequency distribution that is substantially outside of said first resonance frequency distribution.

25. The component of claim 24, wherein the power transmission component is metal.

26. The component of claim 24, wherein said outer surface is formed by a process that prescribes an optimized surface roughness comprising determining one or more properties of the power transmission component, determining a rate of contact between said outer surface and a second component, determining a distribution of asperities on said outer surface, determining a plurality of asperity resonance frequencies of said outer surface, calculating a distribution of said plurality of asperity resonance frequencies, or applying Kramer criterion.

* * * * *